T. C. Ball,
Lifting Jack,
N° 12,464.   Patented Feb. 27, 1855.
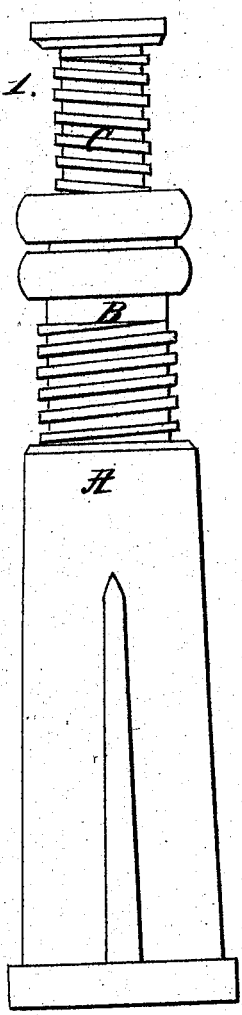
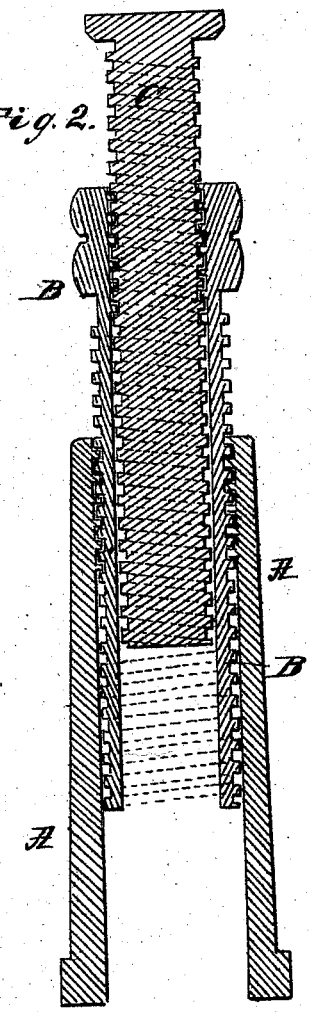

UNITED STATES PATENT OFFICE.

THOMAS C. BALL, OF WALPOLE, NEW HAMPSHIRE.

SCREW-JACK.

Specification of Letters Patent No. 12,464, dated February 27, 1855.

*To all whom it may concern:*

Be it known that I, THOMAS C. BALL, of Walpole, in the county of Cheshire, in the State of New Hampshire, have invented a new and Improved Jack-Screw; and I do hereby declare that the following is a full and exact description thereof, reference being had to the accompanying drawings and to the letters of reference marked thereon.

The nature of my invention consists in providing an iron stand of similar form to those in common use for jack screw stands with two screws, instead of one, as is commonly done, said screws being one within the other and having their threads cut in opposite directions in order that by turning the outer screw, both are elevated, in the time usually employed to elevate a single screw, and, at the same time securing double height to that acquired by the ordinary jack screw, as will more fully appear from the following description and drawings accompanying.

A, represents the stand; B, the tubular screw fitted within said stand.

C, represents the interior screw which is fitted within the tubular screw B. The tubular screw B has formed upon its outer surface, a "right hand" thread, having its counterpart within the stand A, and working therein like any ordinary screw; while the interior screw C, has formed upon its outer surface a "left hand" thread, and has its counter part within the tubular screw B, working in like manner within said tubular screw B.

From this description it will clearly appear, that, while the load or body to be elevated rests upon the interior screw C and prevents the same from revolving about its centers, the tubular screw is left at liberty to be revolved by the operater, and while working, as aforesaid within the stand A, and elevating by means of its "right hand" thread; it also, at the same time, operates upon the interior screw C, by means of its "left hand" thread, and thus elevates the interior screw C. Hence is secured, by the revolution of the tubular screw B, double the elevation to the load, which is ordinarily attained by the single screws in common use.

I do not claim the invention of jack screws, nor any of the forms thereof, heretofore used; and I am aware that a jack screw has been constructed in which the center piece has two opposite threaded screws, one on each end and working in two female screws, one above and the other below—but

What I claim, &c., is—

The combination of the tubular screw B with the standard A and the inner screw C, the whole being arranged substantially as and for the purpose above set forth and described.

THOS. C. BALL.

Witnesses:
S. M. BATES,
FREDERICK VOSE.